US010145966B2

(12) United States Patent
Shedlock et al.

(10) Patent No.: US 10,145,966 B2
(45) Date of Patent: Dec. 4, 2018

(54) METHODS FOR FABRICATING PIXELATED SCINTILLATOR ARRAYS

(71) Applicant: Varian Medical Systems, Inc., Palo Alto, CA (US)

(72) Inventors: Daniel Shedlock, Knoxville, TN (US); Keith Vaigneur, Knoxville, TN (US)

(73) Assignee: Varian Medical Systems, Inc., Palo Alto, CA (US)

( * ) Notice: Subject to any disclaimer, the term of this patent is extended or adjusted under 35 U.S.C. 154(b) by 347 days.

(21) Appl. No.: 14/874,285

(22) Filed: Oct. 2, 2015

(65) Prior Publication Data

US 2017/0097424 A1    Apr. 6, 2017

(51) Int. Cl.
*G01T 1/20* (2006.01)
*G01T 1/202* (2006.01)

(52) U.S. Cl.
CPC ............ *G01T 1/2002* (2013.01); *G01T 1/202* (2013.01); *G01T 1/2018* (2013.01)

(58) Field of Classification Search
CPC ... G01T 1/1642; G01T 1/1644; G01T 1/2018; G01T 1/20; G01T 1/204
See application file for complete search history.

(56) References Cited

U.S. PATENT DOCUMENTS

| 3,654,172 | A | * | 4/1972 | Reade | ..................... | C03C 3/095 |
|---|---|---|---|---|---|---|
|  |  |  |  |  |  | 252/301.4 F |
| 5,108,959 | A |  | 4/1992 | Buchanan et al. |  |  |
| 5,120,970 | A |  | 6/1992 | Buchanan et al. |  |  |

(Continued)

FOREIGN PATENT DOCUMENTS

| JP | 05-100035 A | 4/1993 |
|---|---|---|
| JP | 2012-194009 A | 10/2012 |

OTHER PUBLICATIONS

USPTO, Office Action in U.S. Appl. No. 14/870,044 dated Feb. 22, 2017 (20 pages).

(Continued)

*Primary Examiner* — David Porta
*Assistant Examiner* — Mamadou Faye

(57) ABSTRACT

A method of making pixelated scintillator arrays employs a first jig comprising a plurality of recesses and a second jig comprising a plurality of recesses. A plurality of or N scintillator pixels are placed in a plurality of or N recesses of the first jig. The N scintillator pixels have a shape such that a portion of each of the N scintillator pixels is conformably received in one of the N recesses of the first jig, e.g. a portion of each of the N scintillator pixels is received in and conforms to the shape of one of the N recesses. The remaining portion of each of the N scintillator pixels protrudes out from the recess, forming N protrusions substantially conforming to the shape of the recesses of the second jig. An adhesive layer is applied on the N protrusions of the N scintillator pixels. A reflective layer is placed over the N protrusions of the N scintillator pixels. The recesses of the second jig are aligned with the N protrusions of the N scintillator pixels and the reflective layer is pressed with the second jig such that at least a portion of the reflective layer conforms to the N protrusions of the N scintillator pixels, forming a first row of a scintillator array comprising the N scintillator pixels and the at least portion of the reflective layer.

31 Claims, 8 Drawing Sheets

(56) References Cited

U.S. PATENT DOCUMENTS

| | | | |
|---|---|---|---|
| 5,122,671 A | 6/1992 | Buchanan et al. | |
| 5,391,320 A | 2/1995 | Buchanan et al. | |
| 5,496,502 A | 3/1996 | Thomson | |
| 5,970,115 A | 10/1999 | Colbeth et al. | |
| 6,967,330 B1 | 11/2005 | Lempicki | |
| 7,157,014 B1 | 1/2007 | Andreaco | |
| 7,291,842 B2 | 11/2007 | Zentai et al. | |
| 7,816,651 B2 | 10/2010 | Green | |
| 8,204,171 B2 | 6/2012 | Ikhlef | |
| 8,552,386 B2 | 10/2013 | Morf et al. | |
| 8,890,198 B2 * | 11/2014 | Ho | H01L 31/02322 257/98 |
| 2002/0079455 A1 | 6/2002 | Wieczorek | |
| 2004/0251420 A1 | 12/2004 | Sun | |
| 2005/0029462 A1 | 2/2005 | Lyons et al. | |
| 2006/0054863 A1 | 3/2006 | Dai | |
| 2007/0085010 A1 | 4/2007 | Letant et al. | |
| 2010/0032578 A1 | 2/2010 | Levene | |
| 2010/0127180 A1 * | 5/2010 | Lifshitz | G01T 1/1644 250/367 |
| 2011/0110490 A1 | 5/2011 | Samant | |
| 2013/0034715 A1 * | 2/2013 | Peng | C04B 35/6261 428/220 |
| 2015/0331117 A1 * | 11/2015 | Ho | G01T 1/2004 250/367 |
| 2017/0090042 A1 | 3/2017 | Shedlock et al. | |
| 2017/0131414 A1 * | 5/2017 | Perna | G01T 1/2002 |
| 2017/0285183 A1 | 10/2017 | Shedlock | |

OTHER PUBLICATIONS

USPTO, Office Action in U.S. Appl. No. 14/870,044 dated Jul. 17, 2017 (20 pages).

USPTO, Office Action in U.S. Appl. No. 15/089,422 dated Oct. 11, 2017 (13 pages).

USPTO, Office Action in U.S. Appl. No. 15/089,422 dated Apr. 2, 2018 (14 pages).

USPTO, Office Action in U.S. Appl. No. 14/870,044 dated Feb. 14, 2018 (21 pages).

Hidnert et al., Thermal Expansion of Tungsten, Scientific Papers of the Bureau of Standards, Aug. 1925, 6 pages.

Saint-Gobain Industrial Ceramics, Inc., (BC-400/BC-404/BC-408/BC-412/BC-416 Premium Plastic Scintillators Data Sheet, Mar. 1998, 2 pages.

* cited by examiner

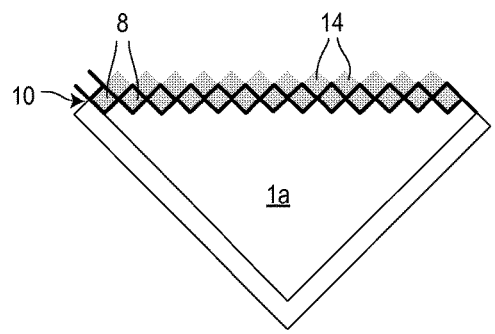
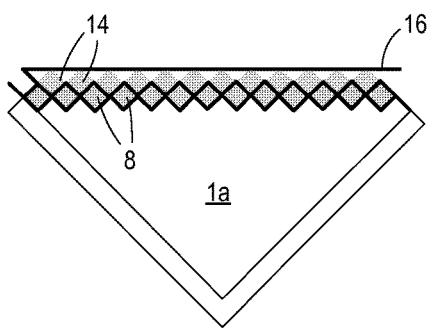
FIG. 6  FIG. 7
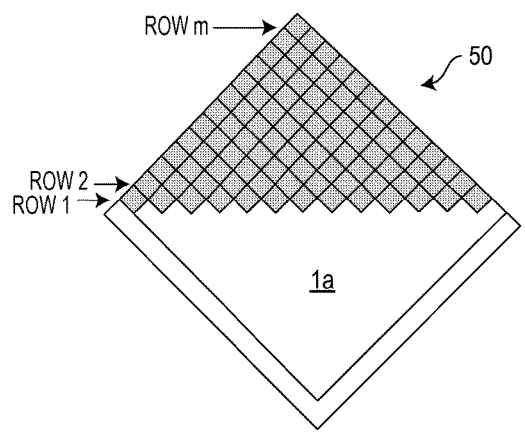
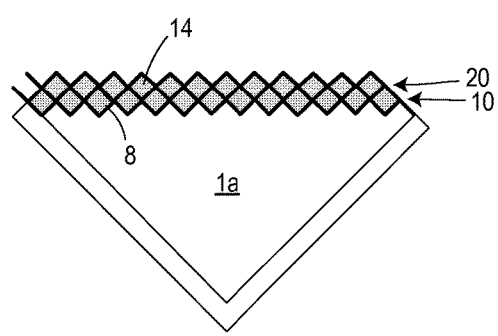
FIG. 9  FIG. 8

METHODS FOR FABRICATING PIXELATED SCINTILLATOR ARRAYS

TECHNICAL FIELD

Embodiments of this disclosure relate generally to x-ray imaging apparatuses and methods. In particular, various embodiments of methods of fabricating pixelated scintillator arrays and image detectors containing pixelated scintillator arrays are described.

BACKGROUND

X-ray image detectors are widely used in medical imaging, security inspection, scientific research, and other industries. An x-ray image detector may include a scintillator layer and a detector array. The scintillator layer absorbs incident x-ray radiation indicative of the structure of an object imaged and converts the absorbed radiation into light photons. The detector array may collect light photons generated and convert them into measurable electrical signals, which may be amplified, digitized, or further processed by various electrical circuitry and algorithms known in the art. The detector array may include addressable photosensitive elements such as photodiodes and switching transistors such as TFT or CMOS transistors.

To improve the spatial resolution of images, light photons generated in the scintillator layer should ideally be recorded by the detector elements located vertically beneath the scintillators that generate the light photons. Crosstalk between pixels should be kept to a minimum. To accomplish that, pixelated scintillators, which can limit lateral spread of light photons, are developed. Conventionally, a pixelated scintillator is formed by a "slice and dice" approach. A block of a scintillator crystal is cut into slices that may or may not be polished. The slices are applied with a layer of reflective septa or coating and reassembled against each other, now separated by the reflective septa. The assembly is then rotated 90 degrees and the block is again sliced, coated, and reassembled. The final pixelated array then has square or rectangular "pixels" surrounded by reflective septa on all four sides.

The conventional approach of preparing pixelated scintillators is labor intensive, and the cost associated with slicing and re-assembling in making large area pixelated scintillator arrays is prohibitive. Further, the loss of material from cutting can also be significant if the pitch of the scintillator array is very small.

Accordingly, there is a further need for innovative methods of fabricating pixelated scintillator arrays.

SUMMARY

Certain embodiments of a method of fabricating pixelated scintillator arrays are set forth below. It should be understood that these embodiments are presented merely to provide the reader with a brief summary of certain forms the invention might take and that these embodiments are not intended to limit the scope of the invention. Indeed, the invention may encompass a variety of embodiments or aspects that may not be set forth below.

In an exemplary embodiment of a method for fabricating pixelated scintillator array, a first jig comprising a plurality of recesses and a second jig comprising a plurality of recesses are provided. A plurality of or N scintillator pixels are placed in a plurality of or N recesses of the first jig. The N scintillator pixels have a shape such that a portion of each of the N scintillator pixels is conformably received in one of the N recesses of the first jig, e.g. a portion of each of the N scintillator pixels is received in and conforms to the shape of one of the N recesses. The remaining portion of each of the N scintillator pixels protrudes out from the recess, forming N protrusions substantially conforming to the shape of the recesses of the second jig. An adhesive layer is applied on the N protrusions of the N scintillator pixels. A reflective layer is placed over the N protrusions of the N scintillator pixels. The recesses of the second jig are aligned with the N protrusions of the N scintillator pixels and the reflective layer is pressed with the second jig such that at least a portion of the reflective layer conforms to the N protrusions of the N scintillator pixels, forming a first row of a scintillator array comprising the N scintillator pixels and the at least portion of the reflective layer.

In an aspect, a pixelated scintillator array comprising a plurality of scintillator pixels arranged in rows and columns is provided. In the pixelated scintillator array, each pixel comprises an amorphous scintillator material and is separated from adjoining pixels by a reflective layer.

In a further aspect, an x-ray imager is provided. The x-ray imager comprises a pixelated scintillator layer generating light photons from x-ray radiation and a detector array producing electrical signals from light photons. The pixelated scintillator layer comprises one or more scintillator arrays each comprising a plurality of scintillator pixels arranged in rows and columns. Each of the plurality of scintillator pixels comprises an amorphous scintillator material and is separated from adjoining pixels by a reflective layer.

Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

FIGS. 6-9 schematically show some steps of building successive rows of a scintillator array according to embodiments of the disclosure;

DETAILED DESCRIPTION

Figure 1:
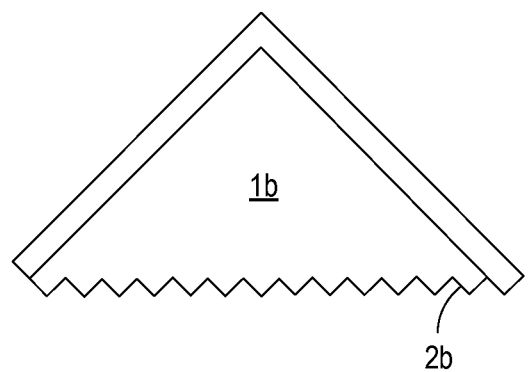
FIG. 1 depicts a foundation jig and an alignment jig according to embodiments of the disclosure.
Figure 1:
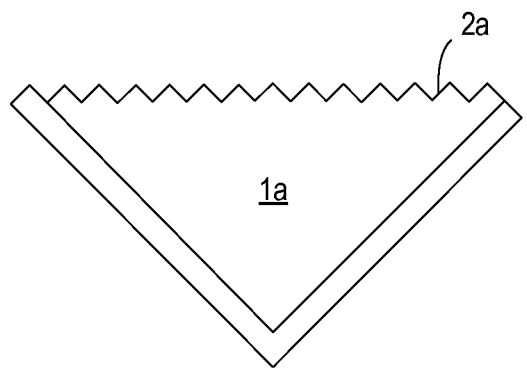

Various embodiments of methods of making pixelated scintillator arrays and image detectors comprising a pixelated scintillator layer are described. It is to be understood that the disclosure is not limited to the particular embodiments described as such may, of course, vary. An aspect described in conjunction with a particular embodiment is not necessarily limited to that embodiment and can be practiced in any other embodiments.

Embodiments of the disclosure may be described with reference to the figures. It should be noted that some figures are not necessarily drawn to scale. The figures are only intended to facilitate the description of specific embodiments, and are not intended as an exhaustive description or as a limitation on the scope of the disclosure. Further, in the following description, specific details such as examples of specific materials, dimensions, processes, etc. may be set forth in order to provide a thorough understanding of the disclosure. It will be apparent however to one of ordinary skill in the art that some of these specific details may not be employed to practice embodiments of the disclosure. In other instances, well known components or process steps may not be described in detail in order to avoid unnecessarily obscuring the embodiments of the disclosure.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise.

For ease of description of various embodiments, the terms "first" and "second" may be used to distinguish one element or step from another element or step. For example, first and second rows, first and second reflective layers, and first and second jigs etc. may be used in describing various embodiments of the disclosure. The use of the terms "first" and "second" should not be construed as assigning the elements or steps in any particular order. The terms "first" and "second" are used to merely distinguish one element or step from another element or step. Further, for ease of description of various embodiments, the letters "N" or "m" may be used to reference a plurality of elements or steps, for example, two or more scintillator pixels or rows.

As used herein, the term "scintillator pixel," "pixelated scintillator array," or "pixelated scintillator layer" refers to embodiments where a scintillator piece is physically or optically isolated from adjoining scintillator pieces.

The disclosure provides methods of fabricating pixelated scintillator arrays that overcome drawbacks experienced in the prior art. According to embodiments of a method of the disclosure, a foundation jig and an alignment jig are used in building a unit array block of scintillator pixels. The scintillator pixels may be made of an amorphous scintillator material. The scintillator pixels may be fire polished. Alternatively, the scintillator pixels may be made of a crystalline scintillator material.

Foundation Jigs and Alignment Jigs

FIG. 1 schematically shows cross-sections of a foundation jig 1a and an alignment jig 1b that can be used in a fabrication method according to embodiments of the disclosure. As shown in FIG. 1, the foundation jig 1a may include a plurality of grooves or recesses 2a configured to receive a plurality of scintillator pixels. The plurality of recesses 2a may be elongate grooves substantially in parallel configured to receive a plurality of elongate scintillator pixels. The recesses 2a may be shaped and/or sized based on the shape and size of the scintillator pixels. The recesses 2a may be machined such that a portion of a scintillator pixel may be conformably received in a recess and the remaining portion of the pixel may protrude out from the recess, as will be described further below.

In a particular embodiment, each of the recesses 2a may be a V-shaped groove with an inclined angle. As an example, the V-shaped grooves may have an inclined angle of 90 degrees configured to receive scintillator pixels having the shape of a rectangular or square prism. When a scintillator pixel having the shape of a rectangular prism is placed in a V-shaped groove having an inclined angle of 90 degrees, a half portion of the scintillator pixel may be conformably received in the groove and the remaining half portion of the pixel protrudes out from the groove. The recesses 2a may also be in other alternative profiles depending on the shape and/or size of the scintillator pixels pre-formed. For example, the recesses 2a may be V-shaped with a different inclined angle such as 60, 120 degrees or the like. The recesses 2a may also have a cross-sectional shape of a trapezoid configured to receive scintillator pixels having the shape of a hexagonal prism.

The foundation jig 1a can be machined to provide an accurate pitch for building a scintillator array block. For example, a plurality of V-shaped recesses 2a may be machined to provide a pixel pitch ranging from about 0.05 mm to about 40 mm. The length of the recesses 2a may be about the same as the thickness of a finished final array. Alternatively, the length of the recesses 2a may be an integer multiple of the thickness of a finished final array plus a cutting blade kerf and polishing losses to finish the final surface, as will be described in greater detail below. As an example, the recesses 2a of the foundation jig 1a may have a length ranging from about 10 mm to about 110 mm and the cross-sections may have a side dimension ranging from about 0.05 mm to about 40 mm. It should be noted that the specific details are provided for a thorough understanding of the disclosure. It will be apparent to one of ordinary skill in the art that some of these specific details may not be required to practice embodiments of the disclosure.

Referring to FIG. 1, the alignment jig 1b works with the foundation jig 1a to maintain the pixel pitch in building a pixel array block. The alignment jig 1b may include a plurality of grooves or recesses 2b. The plurality of recesses 2b may be elongate grooves substantially in parallel. Each of the recesses 2b of the alignment jig 1b may be shaped and sized to conform to a portion of a scintillator pixel protruding out from a recess 2a of the foundation jig 1a.

Figure 2A:
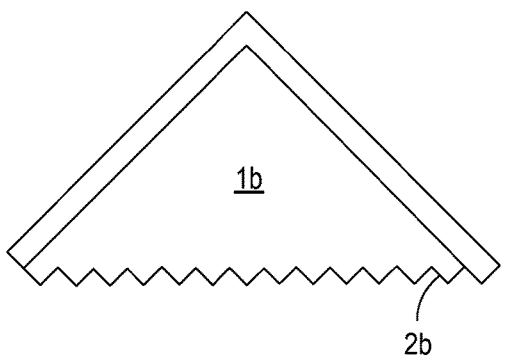
FIG. 2A shows a piece of septa material placed over a foundation jig according to embodiments of the disclosure.
Figure 2A:
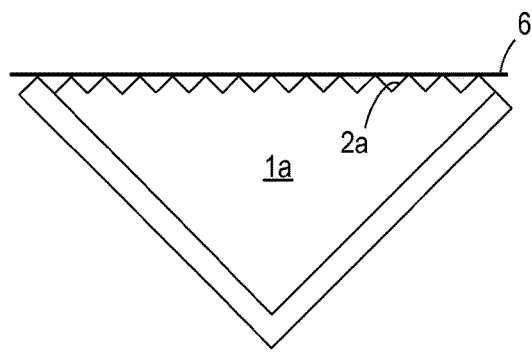
Figure 2B:
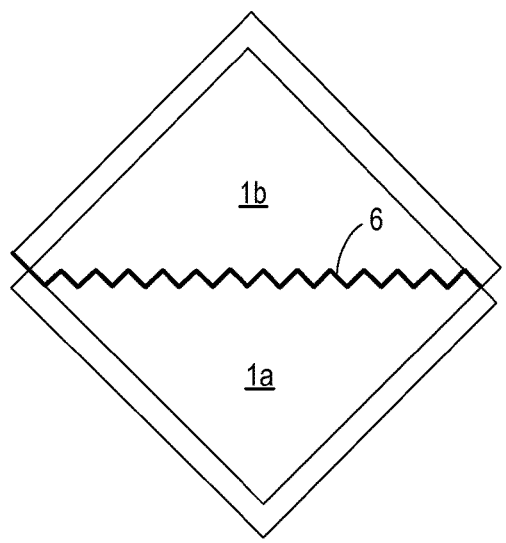
FIG. 2B shows an alignment jig and a foundation jig fit together in pressing a piece of septa material into place according to embodiments of the disclosure.

In some embodiments, the alignment jig 1b may be constructed to provide a recess configuration that matches the recess configuration of the foundation jig 1a. By way of example, the alignment jig 1b and the foundation jig 1a may both have V-shaped recesses 2b, 2a with an inclined angle of 90 degrees. When in use, the alignment jig 1b may be positioned offsetting the foundation jig 1a by half the pitch so that the peaks of the grooves 2b of the alignment jig 1b may fit in the valleys of grooves 2a of the foundation jig 1a. This would allow a reflective layer to be pressed into the recesses 2a of the foundation jig 1a as will be described in greater detail below. FIG. 2A shows a reflective layer 6 placed over the foundation jig 1a and FIG. 2B shows that the alignment jig 1b and the foundation jig 1a fit in together, pressing the reflective layer 6 into the recesses 2a of the foundation jig 1a. Furthermore, because each of the recesses 2b of the alignment jig 1b conforms to a portion of a scintillator pixel protruding out from one of the recesses 2a of the foundation jig 1a, the alignment jig 1b can maintain the pixel pitch in building pixel array blocks, as will be described in greater detail below.

The foundation jig 1a and alignment jig 1b may be made of any suitable materials such as any suitable metal, metal alloys, ceramics, and plastics etc.

Methods of Fabricating Pixelated Scintillator Arrays

Referring now to FIGS. 2-11, various embodiments of a method of fabricating a pixelated scintillator array will now be described.

As shown in FIG. 2A, a piece of septa material or a reflective layer 6 is placed over the foundation jig 1a. Any suitable septa materials known in the art can be used. By way of example, the septa material can be a piece of aluminized Mylar® or ESR Vikuiti®. The reflective layer 6 may be automatically pulled over across the foundation jig 1a. Depending on the physical properties, the reflective layer 6 may be drawn into the recesses 2a of the foundation jig 1a with vacuum, thereby allowing at least a portion of the reflective layer 6 to conform to the shape of the recesses 2a. Alternatively, the reflective layer 6 may be pressed into the recesses 2a of the foundation jig 1a with the alignment jig 1b, by aligning the peaks of the recesses 2b of the alignment jig 1b with the valleys of the recesses 2a of the foundation jig 1a. The reflective layer 6 may have a smooth or polished surface. Alternatively, the reflective layer 6 may have an unpolished or rough. the FIG. 2B shows the foundation jig 1a and the alignment jig 1b fit together, with a reflective layer 6 being pressed in between.

An adhesive layer (not shown) may be applied on the reflective layer 6. Any suitable adhesives known in the art with desired viscosity and optical properties may be used. The viscosity of the adhesive is preferably low, such as about 20 rpm or 1,000 cP per ASTM D-1084. The adhesive material is preferably transparent to the visible light. Exemplary adhesives include but are not limited to anaerobic epoxy adhesives and two-part epoxy adhesives. The adhesive can be heat cured or light cured.

Figure 3A:
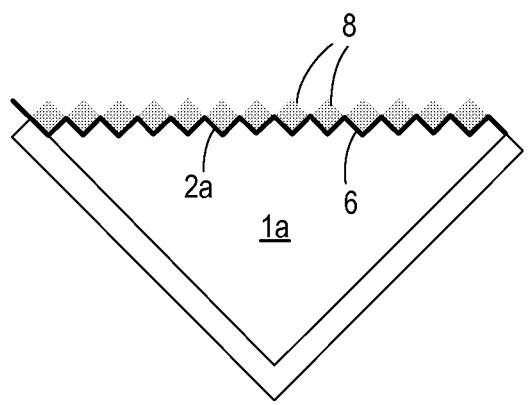
FIGS. 3A, 3B, 4, and 5 schematically show some steps of building a row of a scintillator array according to embodiments of the disclosure.

Referring to FIG. 3A, a plurality of or N scintillator pixels 8 may be placed into the recesses 2a of the foundation jig 1a, which may have been provided with a reflective layer 6 and applied with an adhesive layer. The scintillator pixels 8 may be pre-formed with a shape and a size such that when the scintillator pixels 8 are placed in the recesses 2a of the foundation jig 1a, a portion of a scintillator pixel 8 is conformably received in a recess 2a and the remaining portion of the pixel protrudes out from the recess 2a. In the exemplary embodiment shown in FIG. 3A, the scintillator pixels 8 are pre-formed having the shape of a rectangular or square prism, and the recesses 2a of the foundation jig 1a are V-shaped with an inclined angle of 90 degrees. When such scintillator pixels 8 are placed in the recesses 2a of the foundation jig 1a, a half portion of a rectangular or square prism is conformably received in a V-shaped recess and the remaining half portion protrudes out from the recess.

The length of the pre-formed scintillator pixels 8 may be about the thickness of a finished array. Alternatively, the length of the scintillator pixels 8 is an integer multiple of a final finished scintillator array plus a blade kerf and polishing losses to finish the final surface. For example, in an embodiment where the finished array is about 10 mm thick, the unit length of the scintillator pixels 8 may be about 110 mm. This would produce ten final arrays with 1 mm or 10% material loss per array. This would be a significant improvement over the prior art "slicing and dicing" method where the material loss per array is as high as about 40%.

Figure 13:
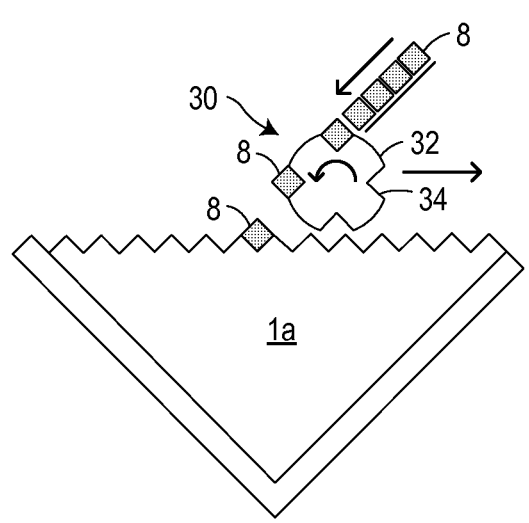
FIG. 13 depicts a rotating wheel that can be used to automatically feed scintillator pixels.

Still referring to FIG. 3A, the scintillator pixels 8 may be automatically fed into the recesses 2a of the foundation jig 1a. One way of feeding the scintillator pixels 8 is to use a plate with a slot cut for the scintillator pixels to fall through. As the plate transitions over the foundation jig 1a, a linear actuator may push the scintillator pixels in the slot. Gravity and/or geometry will help place the scintillator pixels correctly in position, e.g. allowing an edge of a rectangular or square prism to align with the valley of a recess of the foundation jig. Visual inspection with a camera or by a person may determine if the pixels are properly aligned. Alternatively or additionally, the foundation jig 1a may be vibrated to aid in properly aligning the scintillator pixels. The scintillator pixels may also simply be fitted in place by the operator's hand. FIG. 13 schematically shows a rotating wheel 30 that can be used to automatically feed scintillator pixels 8. The rotating wheel 30 may include a cylinder 32 provided with one or more elongate slots 32 for receiving scintillator pixels 8. As the cylinder 30 rotates and translates over the foundation jig 1a, gravity and/or geometry will help place the scintillator pixels 8 correctly in position, e.g. allowing an edge of a rectangular or square prism to align with the valley of a recess of the foundation jig.

Figure 3B:
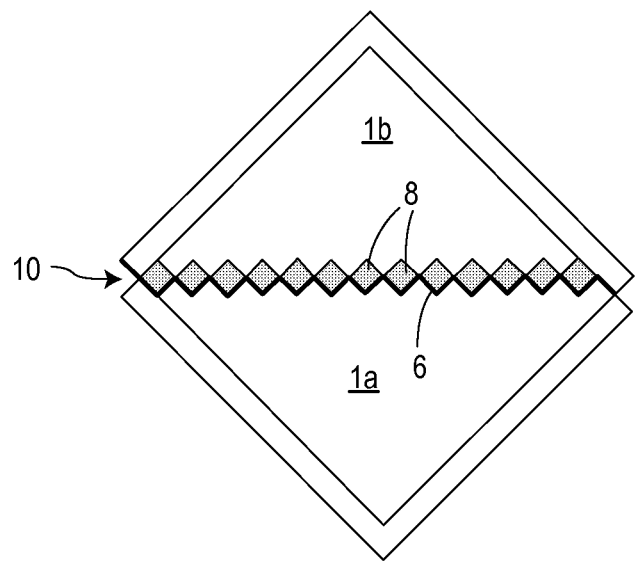

FIG. 3B shows that the alignment jig 1b can be used to press the scintillator pixels 8 against the foundation jig 1a to maintain the pixel pitch. In pressing the scintillator pixels 8 against the foundation jig 1a, the recesses 2b of the alignment jig 1b receive the protruding portions of the scintillator pixels 8. The scintillator pixels 8 may be bonded with the reflective layer 6 at this stage or the curing may take place at a future step, as will be described in greater detail below.

The scintillator pixels 8 may be made of an amorphous scintillator material. Alternatively, the scintillator pixels may be made of crystalline scintillator material. Exemplary amorphous scintillator materials include and are not limited to borate and silicate glasses doped with rare earths such as cerium and terbium to optimize the wavelength of the emitted light to the detector array. For example terbium doped scintillator are typically in the green spectrum, around 550 nm, near the optimal level for amorphous silicon (a-Si) detector arrays. Other elements or compounds that can be incorporated in the borate or silicate glasses include gadolinium oxides, cerium oxides, or europium oxides, etc. By way of example, the scintillating borate or silicate glasses may include 1-20 percent of terbium oxides, 1-15 percent gadolinium oxides, and certain percent of other oxides. Other suitable ingredients such as stabilizers and flux etc. may also be included in the scintillator glasses. U.S. Pat. Nos. 5,108,959, 5,120,970, 5,122,671, and 5,391,320 disclose various silicate and borate scintillator glasses, the disclosures of all of which are incorporated herein by reference in their entirety.

Other exemplary scintillator materials include scintillating nanoparticles embedded in an amorphous base material. The nanoparticles are preferably nanospheres having diameters smaller than the wavelength of the emitted light to reduce scatter centers and re-absorption. Plastic scintillator materials such as poly vinyl toluene (PVT) embedded with various scintillating dopants can also be used. In general, dopants in the amorphous base material control the emission spectra and decay time. Plastic scintillator materials are commercially available e.g. from Saint-Gobain of Hiram, Ohio, United States.

The scintillator pixels 8 may be pre-formed using a standard glass drawing technique known in the art. Various glass drawing techniques are known in the art and therefore their detailed description is omitted herein in order to focus on description of embodiments of this disclosure. In general, an amorphous scintillator material may be heated in a furnace at elevated temperatures to provide a molten glass or an amorphous scintillator material in a molten state. The molten glass may then pass through a bushing plate including one or more fine orifices. The molten glass passes through the fine orifices and come out as fine filaments or scintillator pixels. The orifices in the bushing plate may be sized and shaped to allow formation of scintillator pixels with a desired size and shape. It should be noted that any other glass drawing apparatuses and techniques may be used to make the scintillator pixels. For example, scintillator pixels may be pulled or drawn from softened molten glass or preform. The drawn scintillator pixels may be fire polished.

The scintillator pixels 8 may be drawn in various kinds of forms or shapes. For example, the scintillator pixels 8 may have a cross-sectional shape of a circle, square, rectangle, hexagon, and other regular or irregular shape. In some embodiments, the scintillator pixels may be drawn into the form of rectangular, square, or hexagonal prisms. The scintillator pixels 8 can be drawn to various lengths and cross-sectional sizes for different applications. For example, it is possible to draw scintillator cylinders to a diameter of 6 microns in some cases. Scintillator pixels with small sizes may reduce the light output to an unusual value when the aspect ratio (height to pitch) becomes too large. In general, the aspect ratio may range from about 50:1 to about 1:1, or from about 33:1 to about 7.7:1.

Figure 4:
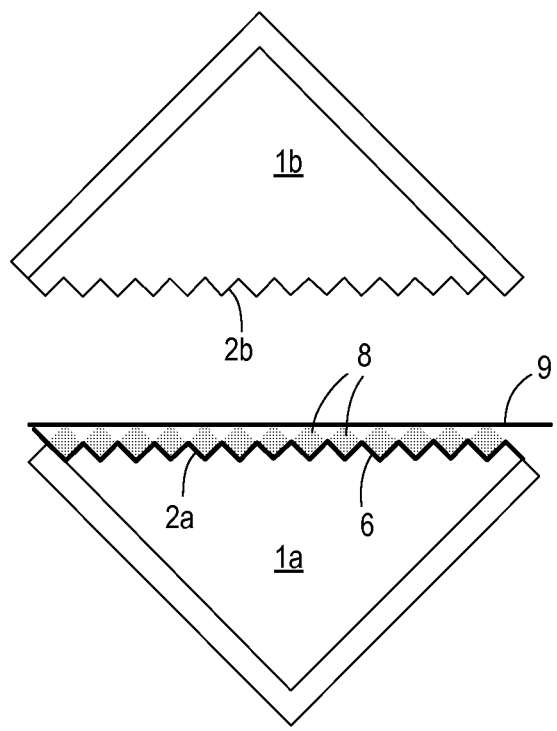
Figure 5:
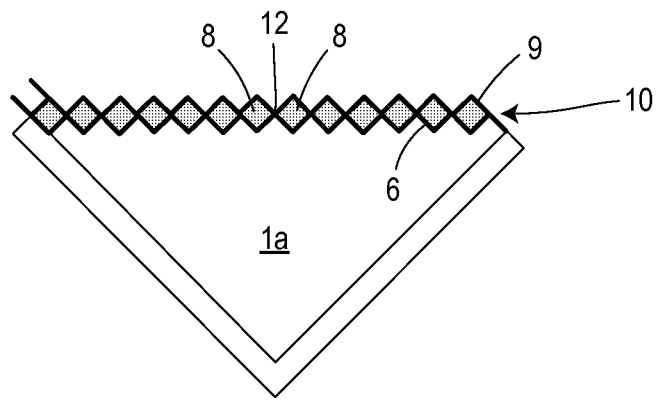

Referring to FIG. 4, a further reflective layer 9 may be placed over the scintillator pixels 8, which may have been applied with a further adhesive layer (not shown) on the portions protruding out from of the recesses 2a of the foundation jig 1a. The alignment jig 1b can then be used to set the reflective layer 9 into place, allowing at least a portion of the reflective layer 9 to conform to the protrusion portions of the scintillator pixels 8, as shown in FIG. 5. Alternatively, a reflective material may be spayed or applied in suitable means on the scintillator pixels 8. The scintillator pixels 8 may be bonded or the adhesives cured at this stage to maintain the pixel pitch. A row of scintillator pixels or first row 10 is thus formed comprising N scintillator pixels 8, coated with a reflective layer 6 and a reflective layer 9.

Referring to FIGS. 6-9, successive rows of scintillator pixels, i.e., from the second row to the $m^{th}$ rows, may be formed by repeating the above steps. The second row may comprise a number of scintillator pixels one fewer than the first row and the $m^{th}$ row may comprise a single scintillator pixel. In forming each successive row, the starting position for placing the scintillator pixels may be offset by ½ the pitch and the number of pixels may be one fewer than the number of pixels in the previous row. It should be noted that the reflective layers can be a single size and be trimmed at the end of the process.

Specifically, referring to FIG. 6 in preparing the second row of the array block, N-1 scintillator pixels 14 may be placed into N-1 recesses formed between adjacent pixels of the N scintillator pixels 8 of the first row 10. In an exemplary embodiment where the elongate recesses 2a of the foundation jig 1a are V-shaped with an inclined angle of 90 degrees and the scintillator pixels 8 of the first row 10 have the shape of a rectangular or square prism, the N-1 recesses formed by the first row scintillator pixels 8 are also V-shaped with an inclined angle of 90 degrees. When the N-1 scintillator pixels 14 are placed in the N-1 recesses, a portion of each of the N-1 scintillator pixels 14 is conformably received in one of the N-1 recesses formed by the first row pixels 8 and the remaining portion of the pixel protrudes out. The protruding portions of the N-1 scintillator pixels 14 have a shape conforming to the recesses 2b of the alignment jig 1b.

Referring to FIG. 7, after an adhesive layer (not shown) is applied on the protruding portions of the N-1 scintillator pixels 14, a further reflective layer 16 may be placed over the N-1 scintillator pixels 14. The reflective layer 16 may then be pressed with the alignment jig 1b, allowing at least a portion of the reflective layer 16 to be set or conform to the protruding portions of the N-1 scintillator pixels 14, as shown in FIG. 8. A second row of scintillator pixels 14 is thus formed, comprising N-1 scintillator pixels 14 coated with a further reflective layer 16. The steps shown in FIGS. 6, 7, and 8 can be repeated until the $m^{th}$ row with a single scintillator pixel is formed, as shown in FIG. 9.

Figure 10:
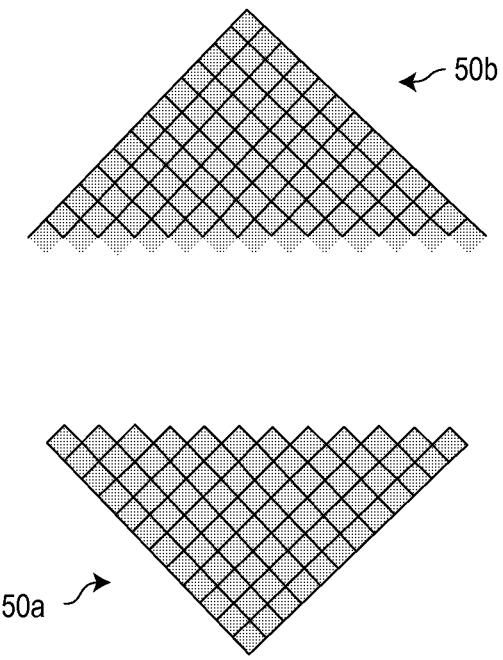
FIG. 10 depicts two half unit array blocks according to embodiments of the disclosure.

FIG. 10 shows two half unit array blocks 50a and 50b fabricated according to embodiments of this disclosure. It should be noted that in the half unit block 50b shown in FIG. 10, a row of scintillator pixels are not bonded with a reflective layer on a side to avoid a double layer of septa material when the unit blocks 50a and 50b are combined. This also helps maintain the accuracy of the pixel pitch. The unit block 50b shown in FIG. 10 can be built up on the same foundation jig 1a and alignment jig 1b or on different jigs. In building the half unit block 50b, the first row of scintillator pixels may be formed by placing N scintillator pixels 8 in the recesses 2a of the foundation jig 1a, without placing the reflective layer 6 and applying any adhesive as shown in FIGS. 2A and 2B. In some embodiment, an outer coating may be put on after the array is fully assembled.

Figure 11:
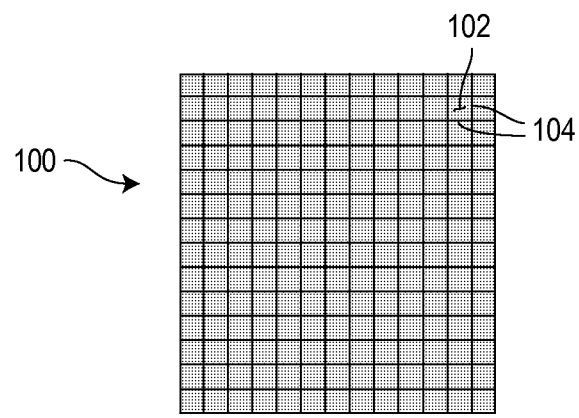
FIG. 11 depicts a unit array block according to embodiments of the disclosure.

The two half unit blocks 50a and 50b can be bonded together to form a single unit block 100, as shown in FIG. 11. FIG. 11 is a top view of the array 100 formed. As described above, the length of the pre-formed scintillator pixels may be the thickness of a finished array. Alternatively, the length of the pre-formed scintillator pixels may be an integer multiple of the thickness of a finished array, in which case the array 100 may be further cut down and polished into final arrays.

Pixelated Scintillator Arrays and X-Ray Imagers Including Same

In another aspect, the disclosure provides pixelated scintillator arrays. As shown in FIG. 11, a pixelated scintillator array 100 of this disclosure may comprise a plurality of scintillator pixels 102 arranged in a plurality of rows and columns, wherein each pixel 102 is separated from the adjoining pixels by a reflective layer 104. Each pixel 102 may have the shape of a rectangular, square, or hexagonal prism.

The scintillator pixels 102 may be formed of an amorphous scintillator material such as silicate or borate glasses incorporated with terbium oxides, scintillating nanoparticles embedded in an amorphous base material, and plastic scintillator materials such as poly vinyl toluene (PVT) embedded with various dopant materials.

Figure 12:
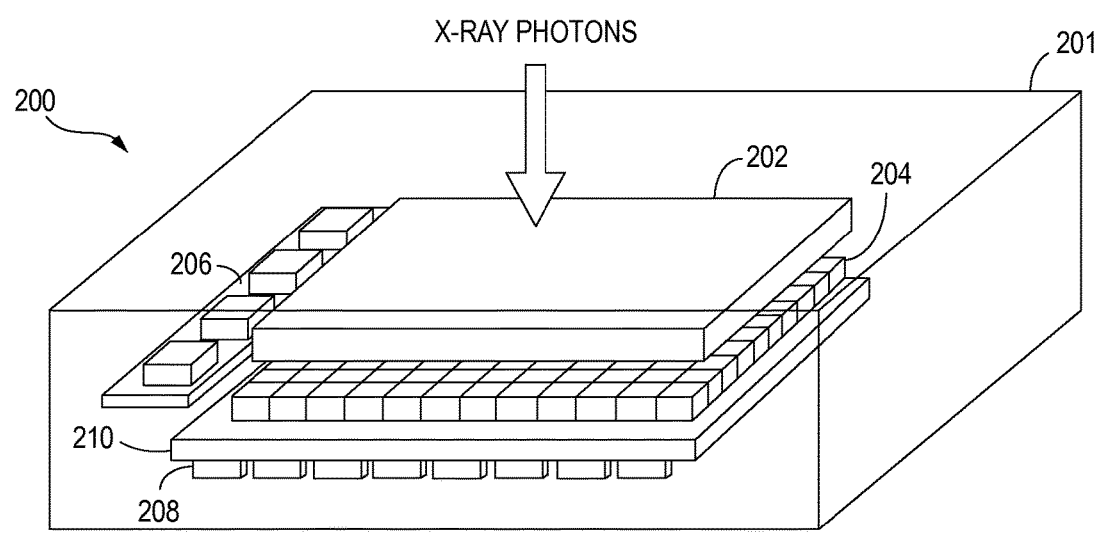
FIG. 12 depicts an image detector according to embodiments of the disclosure.

In a further aspect, the disclosure provides an x-ray image detector. FIG. 12 schematically shows an exemplary x-ray image detector 200 according to embodiments of the disclosure. The x-ray image detector 200 includes a pixelated scintillator layer 202 and a detector array 204. The pixelated scintillator layer 202 generates light photons from x-ray radiation. The pixelated scintillator layer 202 may include one or more scintillator arrays described above.

The detector array 204 converts light photons generated in the pixelated scintillator layer 202 to electrical signals. Various detector arrays are known and therefore their detailed description is omitted here in order to focus on description of embodiments of this disclosure. In general, a detector array may include a large number e.g. hundreds of thousands or millions of detector elements. The large number of detector elements may be arranged in a plurality of rows and a plurality of columns forming an active detector area. Each detector element may include an addressable photosensitive element such as a photodiode and a switching transistor such as a TFT or CMOS transistor.

The image detector 200 may also include a driver control 206 and a readout control 208. The driver control 206 provides control signals for addressing the signal data generated by the detector array 204. The readout control 208 provides control signals for reading out the signal data. In the exemplary embodiment shown in FIG. 12, the detector array 204 and the readout control assembly 208 are mounted on opposing sides of a base plate 210 to minimize the lateral size of the image detector 200. The driver control assembly 206 may also be placed beneath the detector array 204, or the readout control assembly 208 may be placed at a side of the detector array 204. A housing 201 encloses the pixelated scintillator layer 202, the detector array 204, the driver control assembly 206, and the readout control assembly 208. The image detector 200 may further include other electronics for amplifying, digitizing, and processing the electrical signals as known in the art. U.S. Pat. Nos. 5,970,115, 7,291,842, 7,816,651 and 8,552,386 disclose various embodiments of x-ray imaging apparatuses, systems, and electronic components thereof, the disclosures of all of which are incorporated herein by reference in their entirety.

Methods of making pixelated scintillator arrays and image detectors including pixelated scintillator arrays have been described. Those skilled in the art will appreciate that various other modifications may be made within the spirit and scope of the invention. All these or other variations and modifications are contemplated by the inventors and within the scope of the invention.

What is claimed is:

1. A method of fabricating pixelated scintillator arrays, comprising: providing a first jig comprising a plurality of recesses and a second jig comprising a plurality of recesses; placing N scintillator pixels in N recesses of the first jig, wherein a portion of each of the N scintillator pixels is conformably received in one of the N recesses of the first jig and the remaining portion of the each of the N scintillator pixels protrudes out from the one of the N recesses of the first jig, forming N protrusions of the N scintillator pixels substantially conforming to the recesses of the second jig; applying an adhesive layer on the N protrusions of the N scintillator pixels; placing a reflective layer over the N protrusions of the N scintillator pixels; aligning the recesses of the second jig with the N protrusions of the N scintillator pixels and pressing the reflective layer with the second jig to allow at least a portion of the reflective layer to conform to the N protrusions of the N scintillator pixels, thereby forming a first row of a scintillator array comprising the N scintillator pixels and the at least portion of the reflective layer.

2. The method of claim 1, wherein before placing the N scintillator pixels in the N recesses of the first jig, the method further comprising: providing a first reflective layer over the first jig such that at least a portion of the first reflective layer substantially conforms to the N recesses of the first jig; and applying a first adhesive layer on the at least portion of the first reflective layer, thereby forming the first row of the scintillator array comprising the N scintillator pixels, the at least portion of the reflective layer, and the at least portion of the first reflective layer.

3. The method of claim 2, wherein the at least portion of the first reflective layer is drawn to the N recesses of the first jig with vacuum.

4. The method of claim 2, wherein the at least portion of the first reflective layer is pressed into the N recesses of the first jig with the second jig.

5. The method of claim 2, wherein after placing the N scintillator pixels and before applying the adhesive layer on the N protrusions of the N scintillator pixels, the method further comprising curing the first adhesive layer to allow the N scintillator pixels to be bonded.

6. The method of claim 2, wherein after pressing the reflective layer with the second jig, the method further comprising curing the adhesive layer and the first adhesive layer to allow the N scintillator pixels to be bonded.

7. The method of claim 2, wherein the plurality of recesses of the first jig and the second jig are V-shaped with an inclined angle of 90 degree respectively.

8. The method of claim 7, wherein the plurality of recesses of the first jig and the second jig have a length ranging from about 10 mm to about 110 mm respectively.

9. The method of claim 8, wherein the plurality of recesses of the first jig and the second jig have a cross-section with a side dimension ranging from about 0.05 mm to about 40 mm respectively.

10. The method of claim 7, wherein the plurality of recesses of the first jig and the second jig have a pixel pitch ranging from about 0.05 mm to about 40 mm respectively.

11. The method of claim 2, wherein the N scintillator pixels comprise an amorphous scintillator material.

12. The method of claim 11, wherein the amorphous scintillator material comprises silicate or borate glass doped with a rare earth element.

13. The method of claim 11, wherein the N scintillator pixels have the shape of a rectangular or square prism.

14. The method of claim 2, wherein the N scintillator pixels comprise a crystalline scintillator material.

15. The method of claim 2, wherein the N protrusions of the N scintillator pixels form N−1 recesses of the first row of the scintillator array, and method further comprising: placing N−1 scintillator pixels in the N−1 recesses of the first row of the scintillator array, wherein a portion of each of the N−1 scintillator pixels is conformably received in one of the N−1 recesses of the first row and the remaining portion of the each of the N−1 scintillator pixels protrudes out from the one of the N−1 recesses of the first row, forming N−1 protrusions of the N−1 scintillator pixels conforming to the recesses of the second jig; applying a second adhesive layer on the N−1 protrusions of the N−1 scintillator pixels; placing a second reflective layer over the N−1 protrusions of the N−1 scintillator pixels; aligning the recesses of the second jig with the N−1 protrusions of the N−1 scintillator pixels and pressing the second reflective layer with the second jig to allow at least a portion of the second reflective layer to conform to N−1 protrusions of the N−1 scintillator pixels, thereby forming a second row of the scintillator array comprising the N−1 scintillator pixels and the at least portion of the second reflective layer.

16. The method of claim 15, wherein the further steps are repeated until an mth row of the scintillator array is formed, wherein the mth row of the scintillator array comprises one (1) scintillator pixel, and the first through mth rows form a half (½) of the scintillator array.

17. The method of claim 1, wherein after pressing the reflective layer with the second jig, the method further comprising curing the adhesive layer to allow the N scintillator pixels to be bonded.

18. The method of claim 1, wherein the plurality of recesses of the first jig and the second jig are V-shaped with an inclined angle of 90 degree respectively.

19. The method of claim 18, wherein the recesses of the first jig and the second jig have a length ranging from about 10 mm to about 110 mm respectively.

20. The method of claim 19, wherein the plurality of recesses of the first jig and the second jig have a cross-section with a side dimension ranging from about 0.05 mm to about 40 mm respectively.

21. The method of claim 18, wherein the plurality of recesses of the first jig and the second jig have a pixel pitch ranging from about 0.05 mm to about 40 mm respectively.

22. The method of claim 1, wherein the N scintillator pixels comprise an amorphous scintillator material.

23. The method of claim 22, wherein the amorphous scintillator material comprises silicate or borate glass doped with a rare earth element.

24. The method of claim 22, wherein the N scintillator pixels have a shape of a rectangular or square prism.

25. The method of claim 1, wherein the scintillator pixels comprise a crystalline scintillator material.

26. The method of claim 1, wherein the N protrusions of the N scintillator pixels forms N−1 recesses of the first row of the scintillator array, and method further comprising: placing N−1 scintillator pixels in the N−1 recesses of the first row of the scintillator array, wherein a portion of each of the N−1 scintillator pixels is conformably received in one of the N−1 recesses of the first row and the remaining portion of the each of the N−1 scintillator pixels protrudes out from the one of the N−1 recesses of the first row, forming N−1 protrusions of the N−1 scintillator pixels conforming to the recesses of the second jig; applying a second adhesive layer on the N−1 protrusions of the N−1 scintillator pixels; placing a second reflective layer over the N−1 protrusions of the N−1 scintillator pixels; aligning the recesses of the second jig with the N−1 protrusions of the N−1 scintillator pixels and pressing the second reflective layer with the second jig to allow at least a portion of the second reflective layer to conform to N−1 protrusions of the N−1 scintillator pixels, thereby forming a second row of the scintillator array comprising the N−1 scintillator pixels and the at least portion of the second reflective layer.

27. The method of claim 26, wherein the further steps are repeated until an mth row of the scintillator array is formed, wherein the mth row of the scintillator array comprises one (1) scintillator pixel, and the first through mth rows form a half (½) of the scintillator array.

28. The method of claim 27, further comprising combining the half of the scintillator array with the half of the scintillator array of claim 16, forming a unit of the scintillator array.

29. A method of fabricating pixelated scintillator arrays, comprising: providing a first jig comprising a plurality of recesses and a second jig comprising a plurality of recesses; placing N scintillator pixels in N recesses of the first jig, forming a first row of a scintillator array, wherein a portion of each of the N scintillator pixels is conformably received in one of the N recesses of the first jig and the remaining portion of the each of the N scintillator pixels protrudes out from the one of the N recesses of the first jig, forming N protrusions of the N scintillator pixels substantially conforming to the recesses of the second jig, the N protrusions of the N scintillator pixels forming N−1 recesses of the first row; applying an adhesive layer on the N−1 recesses; placing N−1 scintillator pixels in the N−1 recesses of the first row, wherein a portion of each of the N−1 scintillator pixels is conformably received in one of the N−1 recesses and the remaining portion of the each of the N−1 scintillator pixels protrudes out from the one of the N−1 recesses of the first row, forming N−1 protrusions of the N−1 scintillator pixels conforming to the recesses of the second jig; aligning the recesses of the second jig with the N−1 protrusions of the N−1 scintillator pixels and pressing the N−1 scintillator pixels with the second jig, thereby forming a second row of the scintillator array comprising the N−1 scintillator pixels.

30. The method of claim 29, wherein the N−1 protrusions of the second row form N−2 recesses of the second row of the scintillator array, and method further comprising: applying a further adhesive layer on the N−2 recesses of the second row; placing N−2 scintillator pixels in the N−2 recesses of the second row of the scintillator array, wherein a portion of each of the N−2 scintillator pixels is conformably received in one of the N−2 recesses of the second row and the remaining portion of the each of the N−2 scintillator pixels protrudes out from the one of the N−2 recesses of the second row, forming N−2 protrusions of the N−2 scintillator pixels conforming to the recesses of the second jig; aligning the recesses of the second jig with the N−2 protrusions of the N−2 scintillator pixels and pressing the N−2 protrusions with the second jig, thereby forming a third row of the scintillator array comprising the N−2 scintillator pixels.

31. The method of claim 30, wherein the further steps are repeated until an mth row of the scintillator array is formed, wherein the mth row of the scintillator array comprises a single scintillator pixel.

* * * * *